United States Patent [19]

Silverman

[11] 4,280,200

[45] Jul. 21, 1981

[54] SEISMIC METHOD OF MAPPING HORIZONTAL FRACTURES IN THE EARTH

[76] Inventor: Daniel Silverman, 5969 S. Birmingham St., Tulsa, Okla. 74105

[21] Appl. No.: 41,060

[22] Filed: May 21, 1979

[51] Int. Cl.³ .............................................. G01V 1/24
[52] U.S. Cl. ..................................... 367/37; 367/14; 367/75; 166/254; 166/250
[58] Field of Search ....................... 367/14, 35, 37, 47, 367/75; 166/250, 254; 73/155

[56] References Cited

U.S. PATENT DOCUMENTS

| | | | |
|---|---|---|---|
| 2,803,305 | 8/1957 | Behning et al. | 367/37 |
| 3,302,164 | 1/1967 | Waters et al. | 367/75 |
| 3,474,878 | 10/1969 | Loren | 367/35 |
| 3,586,105 | 6/1971 | Johnson et al. | 166/250 |
| 3,739,871 | 6/1973 | Bailey | 367/37 |
| 3,805,587 | 4/1974 | Sayer | 367/37 |
| 3,921,126 | 11/1975 | Waters | 166/250 |
| 4,009,609 | 3/1977 | Sayer et al. | 367/14 |
| 4,044,828 | 8/1977 | Jones et al. | 166/250 |
| 4,057,780 | 11/1977 | Shuck | 367/86 |

OTHER PUBLICATIONS

Albright et al., "Seismic Mapping of Hydraulic Fractures Made in Basement Rocks", 9/10/76, pp. 1–13, ERDA Symp. on Enhanced Oil & Gas Recovery, Tulsa, Okla.
Dennis et al., "Development of . . . in Dry Hot Rock", 5/27/76, pp. 97–107, Proceedings of the 22nd Intern. Instrumentation Symp., San Diego, Calif.

Primary Examiner—Nelson Moskowitz
Attorney, Agent, or Firm—Daniel Silverman

[57] ABSTRACT

A seismic method for mapping horizontal fractures in the earth resulting from the application of fluid pressure, at a selected point, at a selected depth, in the earth, comprising the steps of creating a seismic wave in the earth over the expected position of the fracture, and detecting the seismic waves reflected upwardly at a reflecting interface, at or near the fracture, at each of a plurality of seismic sensors, in at least one radial array. The received signals are recorded for each of two conditions: a first case, when the fracture is pressurized, and filled with fluid, and the roof of the fracture is separated from the base of the fracture; and a second case when the fracture is depressurized, and the roof of the fracture rests on the base. Some sensors will show a different character of reflection signal in the two cases. For these sensors the points of reflection are within the outer perimeter of the fracture. For the other sensors, which show relatively no change in character of reflection signal, the points of reflection are outside of the outer perimeter of the fracture. The process is repeated for both compressional and shear seismic sources, and the electrical signals are compared for compressional and shear sources and for pressurized and depressurized fracture.

22 Claims, 2 Drawing Figures

SEISMIC METHOD OF MAPPING HORIZONTAL FRACTURES IN THE EARTH

BACKGROUND OF THE INVENTION

1. Field of the Invention

This invention lies in the field of artificial fractures in the earth resulting from the application of fluid pressure, at a selected point, at a selected depth, in the earth, in a selected geologic formation, of selected properties.

More particularly this invention is related to the mapping of such fractures, that is, determining the horizontal shape and size of the outer perimeter of the fractures.

2. Background of the Invention

In the petroleum industry over the past 25 years or so, it has been customary to artificially create fractures in the earth by means of fluid pressure applied at selected points in the earth. These processes have come to be known as hydrofracturing, or hydrofraccing, since liquids were the first fluids to be used. Liquids are still used in forming deep vertical fractures, where very high pressures are required.

On the other hand, where the hydrocarbon containing formation is shallow, and the fractures are horizontal, air or steam can be used to create the fractures, such as when creating fractures in shallow tar sands, for example.

However, in all the years that such artificial fracturing has been done, no satisfactory way has been found to precisely determine the azimuth, length and vertical extent of a deep vertical fracture, or the shape and dimension of the outer perimeter of a horizontal fracture.

In a related application, filed on the same date as this application, by M. Darroll Wood, entitled: Method of Determining Change in Subsurface Structure Due to Application of Fluid Pressure to the Earth, he has described a method of positioning tiltmeters on the surface of the earth over the expected position of the fracture, and by observing the variation of tilt of the earth, as a function of the pressure and flow rate of liquid into a deep vertical fracture, he is able to determine the azimuth of, and the horizontal extent of, the deep vertical fracture.

To applicant's knowledge, no other method has been described in the literature, for mapping artificial fractures in the earth.

SUMMARY OF THE INVENTION

The principal object of this invention is to devise a method for mapping artificial horizontal fractures in the earth by the seismic method.

It is a further object of this invention to determine the horizontal dimension and shape of the outer perimeter of a shallow horizontal fracture.

These and other objects are realized and the limitations of the prior art are overcome in this invention by creating a horizontal fracture in the normal manner, either by the application of pressurized liquid or gas, by processes which are well known in the art, and form no part of this invention.

A source of seismic waves, which can produce compressional waves, or shear waves, and can be impulsive or vibratory, as is well known in the art, is set up, at or near the surface of the earth, at a selected point, over the expected position of the fracture. At least one linear array of seismic sensors is positioned at or near the surface of the earth. The array is preferably colinear with the source, and should extend far enough, such that the point of reflection of the seismic waves from the source to a reflecting interface at or near the depth of the fracture, and to the sensors will be at a greater radius from the well bore from which the fracture was created, than the outer perimeter of the fracture.

Thus, of all the reflecting points to each of the sensors, some will be within, and some will be outside of the outer perimeter.

This source is energized in at least two conditions. A first condition P exists when the fracture is pressurized, so that the roof of the fracture is lifted, and out of contact with the base of the fracture, and the fracture is filled with fluid. A second condition N exists when the fracture is depressurized to a pressure less than that required to lift the overburden, so that the roof of the fracture will slump and will be in elastic wave transmitting contact with the base of the fracture.

Consider a sensor receiving a reflection from a reflecting point inside the perimeter. In the first condition P, with the fracture filled with fluid, the reflected signal will be of higher energy content than will the reflected signal from a point outside of the perimeter of the fracture, since there will be no fracture to augment the reflection of seismic energy.

In the second condition N, where the fracture is depressurized or nonpressurized, so far as the reflection of seismic energy is concerned, there is no fracture, and the reflection of seismic energy will be substantially the same at all reflection points.

A third condition, or situation, G, can be considered, where, the pressurizing of the fracture is done slowly, or gradually, or in a series of steps, of the flow of pressurizing fluid. In the third condition G, in effect, the perimeter of the fracture is growing, and the reflection points where substantial seismic energy is reflected move outwardly as the radius of the perimeter increases. Thus, this increasing size of the fracture can be mapped by the increasing number of sensors showing high energy. The radius of the fracture should be a function of the total fluid flow.

A fourth condition C and a fifth condition S, can be considered where the above procedure is repeated, first C, with a compressional seismic source, and then S, with a transverse shear seismic source. In the pressurized condition P, the compressional C, and shear S, reflections will be different, whereas in the depressurized condition N they will be similar.

BRIEF DESCRIPTION OF THE DRAWINGS

These and other objects and advantages, and a better understanding of the principles and details of the invention will be evident from the following description, taken in conjunction with the appended drawings, in which.

DESCRIPTION OF THE PREFERRED EMBODIMENT

The operation of the method of this invention will be better understood by reviewing briefly the principles of the transmission and reflection of seismic waves at geologic interfaces in the earth.

Figure 1:
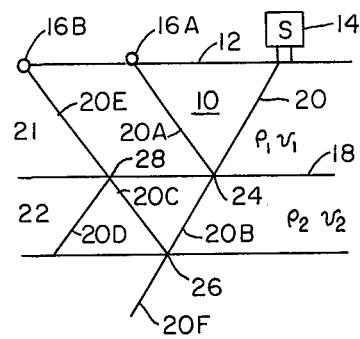
FIG. 1 is a prior art figure representing the transmission and reflection of seismic waves at geologic interfaces.

Referring to FIG. 1, which is fully taught in most text books on the seismic process of geophysical prospecting, the earth 10, having a surface 12 is shown having three geologic formations 21, at the surface, 22 below the formation 21, with an intervening contact or interface 18, and a third formation 23 in contact with 22, at an interface 19.

A seismic source 14 is set up at the surface, and a plurality of sensors, such as geophones 16A, 16B, etc. spaced from the source 14. By conventional representation, a ray of seismic energy 20 passes downwardly to reflection point 24 at the interface 18, where generally, part of the energy is transmitted across the interface 18 as ray 20B, and part is reflected as upwardly reflected ray 20A.

Again, at interface 19, part of the energy of ray 20B is transmitted at reflection point 26 across the interface 19 as ray 20F, and part is reflected upwardly as ray 20C.

Part of the upwardly travelling ray 20C at reflection point 28 is transmitted across the interface 18, from below as the ray 20E, and part is reflected downwardly as ray 20D, and so on.

There are several conditions that are well known. First, at the reflection point 24 for example, the angles of incidence and reflection, are equal. This occurs at all reflection points, such as 24, 26, 28 and so on. Second, the division of energy as between the incident wave and the reflected wave is given by the relation $$R = \frac{Ar}{AI} = \frac{\rho_2 V_2 - \rho_1 V_1}{\rho_2 V_2 + \rho_1 V_1}$$

where

R is the reflection coefficient, or the ratio between the energy of the reflected wave, to the incident wave.

Ar is the energy of the reflected wave.

AI is the energy of the incident wave.

$\rho 1$ is the density of the formation 1 from which the wave is incident.

$\rho 2$ is the density of the formation 2, into which the wave is transmitted.

V1 is the velocity of seismic wave transmission in formation 1.

V2 is the velocity of seismic wave transmission in formation 2.

Of course the energy of the transmitted wave in formation 2 is given by $$At = AI - Ar.$$

The quantity $\rho V$ is called the acoustic impedance of a selected geologic formation. Such formations in the earth have independent densities, and velocities. Thus two different formations may have the same acoustic impedance, yet be considerably different in $\rho$ and/or V, and vice versa.

The reflection coefficients R are generally small, so that sufficient energy can be present in deep reflections, after having been traversing many hundreds or thousands of geologic interfaces.

However, where the reflection takes place between a solid and a liquid, because of the disparity in density and velocity the reflection coefficient can be quite large. Also where the interface is between rock and air, such as at the surface of the earth, the reflection coefficient can be almost 100 percent.

This invention makes use of these principles by comparing the energy of reflected seismic energy from the natural interfaces, such as 18, 19—where there is no fracture, to the case where there is a pressurized fracture filled with liquid or gas, where the reflection coefficient may be high.

Where the seismic source puts out a relatively simple wavelet, the "character" of the reflected seismic wave can be fairly simple. On the other hand, when the incident seismic wave is a long time function, as from a vibratory source, the "character" of the reflected wave can be very complex.

Also, where the seismic waves are shear waves which do not transmit through a liquid or gas the reflected energy can be very large.

Thus by making use of these principles and with the appropriate geometry and observing the character of the seismic waves and their energy, much information can be determined relating to the dimensions of the horizontal fracture.

Figure 2:
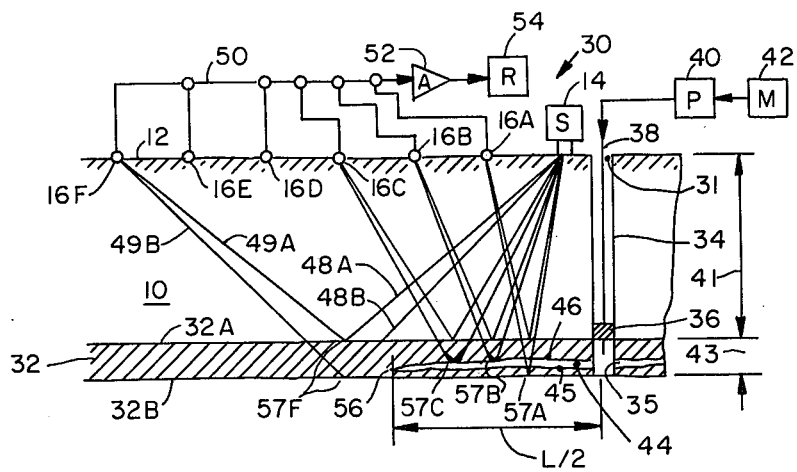
FIG. 2 illustrates schematically one embodiment of this invention.

Referring now to FIG. 2 there is shown schematically one embodiment of this invention, comprising a portion of the earth 10 including the surface 12. There is a well bore 34 drilled in conventional manner from the surface 12 to a depth 41 to and preferably through a geologic formation 32. Such a formation may be, for example, a shallow formation which contains hydrocarbons in the form of tar or very heavy (viscous) oil. For the purpose of recovery of these hydrocarbons a fracture 44 is produced in the body of the formation 32, preferably near the bottom thereof.

Not shown is one or a plurality of secondary boreholes drilled into the formation 32. These must be within the perimeter of the fracture indicated at a radius 56 equal to L/2 from the borehole 34.

The need to have the secondary boreholes in direct communication with the fracture indicates the need to know the precise position of the perimeter at 56. Also the secondary boreholes must be positioned as close to the perimeter as possible to be able to recover all the hydrocarbons within the perimeter.

A fracture fluid is passed down a tubing 38 inside the borehole 34, which is generally lined with casing. A packer 36 is set above the desired depth of fracture and the casing is perforated, 35 at the desired depth of the fracture. The pressurized fluid can be gas or liquid which is pressurized by pump or compressor 40 driven by motor 42.

A source of seismic waves 14 is set up at a selected point, preferably near to the center of the perimeter of the fracture 44, that is, near the mouth 31 of the well bore 34.

An array of a plurality of sensors or geophones 16 is laid out at or near the surface 12 of the earth. This array preferably consists of at least one linear array, colinear with said source. The array is long enough so that at least the outermost sensor 16F will receive reflected seismic waves from a point 57F beyond the outer perimeter 56 of the fracture 44.

Each of the geophones or other sensors 16A, 16B, . . . 16F are each connected by conductors 50 in a conventional manner to a plurality of conventional seismic amplifiers 52 and to a storage, recording means, and/or display 54, as is well known in the seismic art.

The source may provide an impulsive seismic wave, or a vibratory seismic wave, which, passing downwardly into the earth, will reflect from the interfaces 32A and 32B and to each of the sensors 16.

When the fracture is depressurized, condition N, the roof of the fracture will fall into contact with the base. In this condition there will be very little, if any, energy reflected at the fracture plane, though there well may be reflections from the top and bottom interfaces 32A, 32B of the formation 32. These will combine to produce a reflection of a particular character, dependent on the reflection coefficients and spacing between the interfaces, etc.

Now, when the fracture is pressurized with a fluid, condition P, so that the roof 46 of the fracture 44 is clearly separated from the base surface 45 of the fracture there will be seismic reflections possible from the roof 46 and possibly the base 45, which reflections will add to those from the interfaces 32A, 32B, to produce a reflection character which is still more complicated, than in the previous case. There will also be increased amplitude and energy of the reflected waves.

However, only those sensors such as 16A, 16B, 16C for which the reflection points are at a radius from the source 14 which is less than the perimeter radius L/2 will show a large change of energy or character. For those sensors such as 16F for which the reflection point 57F is at a greater radius than L/2 of the perimeter 56 there will be substantially no change in the reflected energy or character received and recorded.

By comparing the character and energy of the reflected signals received by the sensors 16A, 16B, 16C, for the two conditions P and N of pressurization, it will be seen that the perimeter is beyond the radius 57C of the reflection point showing changes in character and energy. And, of course, if the perimeter is at a lesser radius than that of reflection point 57F of the sensor 16F, it will show no change.

It is thus seen that by using as close a spacing between sensors as desired, the radius of the perimeter 56 can be determined as precisely as desired.

It will be clear that if the fracture is pressurized at a slow rate, that is, low rate of fluid flow, that at a partial pressurization, the radius of effective separation of the roof and base of the fracture will exist only over a small radius. Then, as more fluid is pumped into the fracture the effective area of the roof that is lifted will increase, until, at full pressurization the effective perimeter will move to point 56.

Of course, at each stage, when the perimeter radius is less than L/2 there will be fewer sensors with reflection points inside the "then" perimeter, and showing the character and energy changes. Then as the perimeter moves out to 56 more of the sensors out along the array will show the character and energy change.

Since high frequency seismic signals can better delineate closely spaced interfaces, I prefer to use high frequency seismic waves. Also, I prefer to use transverse shear waves, particularly when the pressurizing fluid is a liquid or a gas. Also, I prefer to use an array of sensors which includes a plurality of radial arrays directed at spaced angular positions, to determine the shape of the perimeter.

What has been described is a novel procedure for determining the size and shape of the perimeter of a horizontal fracture in the earth, which utilizes a selected pressurizing procedure, in conjunction with the use of seismic surveying techniques.

Since the reflecting action at the fracture when pressurized with liquid or gas, would be different with compressional waves than with transverse shear waves, I propose to repeat the operations for both types of sources and sensors, for all conditions of pressurization, depressurization, and gradual pressurization.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim, including the full range of equivalency to which each element thereof is entitled.

I claim:

1. In a shallow geological formation, a borehole drilled to said formation, a horizontal fracture in said shallow formation resulting from the prior application of pressurized fracturing fluid to said shallow formation through said borehole;

the method of mapping the shape and size of the outer perimeter of said fracture, comprising the steps of:
(a) providing a selected source of seismic waves at or below the surface of the earth at a selected position above said fracture;
(b) positioning at or near the surface of the earth at least a first sensor of seismic energy, at a known position with respect to said source, said sensor adapted to receive seismic energy generated at said source, and upwardly reflected by a reflecting interface close to said formation, and to convert said seismic energy to electrical signals;
(c) pressurizing said fracture with pressurizing fluid so that the roof of said fracture is lifted out of contact with the base of said fracture, said fracture volume filled with said pressurizing fluid;
(d) operating said source and receiving at said sensor seismic waves which have been reflected at a first reflection point, and recording a first electrical signal;
(e) depressurizing said fracture so that said roof is lowered into intimate elastic wave transmission contact to said base of said fracture;
(f) repeating step (d) to get a second electrical signal; and
(g) comparing said first electrical signal with said second electrical signal.

2. The method as in claim 1 in which said steps (a) through (f) are carried out with a compressional seismic wave source, and said first electrical signal is compared to said second electrical signal; and including the following steps;
(h) repeating steps (a) through (f) using a seismic source of transverse shear waves, to provide a third and a fourth electrical signal respectively; and
(i) comparing said third electrical signal with said fourth electrical signal.

3. The method as in claim 2 including the additional steps of;
(j) comparing said first and said third electrical signals; and
(k) comparing said second and said fourth electrical signals.

4. Method for mapping a horizontal fracture resulting from the application of fluid pressure to the earth at a selected shallow point in the subsurface, comprising, the steps of;
(a) providing a borehole at a selected position on the earth, drilled to a selected depth in a known shallow geologic formation;

(b) providing a source of pressurized fracturing fluid and applying said pressurized fracturing fluid at said selected depth in said borehole;

whereby a horizontal fracture will be formed in the earth at said selected shallow depth in said formation;

(c) providing a source of seismic waves at or near the surface of the earth, over the expected position of said fracture;

(d) positioning at or near the surface of the earth at least a first geophone at a known position, adapted to receive the upward reflection of downwardly directed seismic waves generated by said source, and to convert them to electrical signals;

(e) at any selected time after the preparation of said shallow horizontal fracture, pressurizing said fracture so that the over-burden is lifted and at least a thin layer of fluid fills said fracture, and the roof of said fracture is substantially out of seismic wave transmitting contact with the base of said fracture;

(f) operating said source, and receiving seismic waves reflected from the roof of said fracture and recording a first electrical signal;

(g) depressurizing said fracture so that the over-burden slumps down substantially closing said fracture whereby said roof of said fracture is in seismic wave transmitting contact with the base of said fracture;

(h) repeating step (f) providing a second electrical signal; and (i) comparing said first and second electrical signals from said first geophone in steps (f) and (h).

5. The method as in claim 4 in which said source is a source of shear waves.

6. The method as in claim 5 in which said source is a source of transverse shear waves.

7. The method as in claim 1 in which said source is a source of compressive waves.

8. The method as in claim 1 in which said first geophone is a linear array of spaced geophones.

9. The method of claim 1 in which said pressurized fluid is a gas.

10. The method as in claim 1 in which said pressurized fluid is a liquid.

11. The method as in claim 8 including a plurality of geophones in a linear array colinear with said source.

12. The method as in claim 11 including a plurality of linear arrays of geophones in spaced azimuthal position.

13. The method as in claim 4 in which said source is a source of compressive waves.

14. The method as in claim 1 in which said source is a source of shear waves.

15. The method as in claim 1 in which said source is a source of transverse shear waves.

16. The method as in claim 4 in which said first geophone is a linear array of spaced geophones.

17. The method as in claim 4 in which said pressurizing fluid is a gas.

18. The method as in claim 4 in which said pressurizing fluid is a liquid.

19. The method as in claim 16 including a plurality of geophones in a linear array colinear with said source.

20. The method as in claim 19 including a plurality of linear arrays of geophones in spaced azimuthal position.

21. The method as in claim 4 in which said steps (e) through (f) are carried out with a transverse shear wave seismic source and said first electrical signal is compared to said second electrical signal; and including the following steps;

(h) repeating steps (e) through (h) using a compressional seismic wave source to provide a third and a fourth electrical signal respectively; and (i) comparing said third electrical signal with said fourth electrical signal.

22. The method as in claim 21 including the additional steps of;

(j) comparing said first and said third electrical signals; and (k) comparing said second and said fourth electrical signals.

* * * * *